United States Patent [19]

McGrew

[11] 4,421,380
[45] Dec. 20, 1983

[54] FULL-COLOR HOLOGRAM

[76] Inventor: Stephen P. McGrew, 1717 Columbus Pl., Santa Clara, Calif. 95051

[21] Appl. No.: 194,438

[22] Filed: Oct. 6, 1980

[51] Int. Cl.$^3$ .............................................. G03H 1/30
[52] U.S. Cl. .................................... 350/3.78; 350/3.76
[58] Field of Search .................... 350/3.76, 3.69, 3.75, 350/3.77, 3.6, 3.86, 3.78

[56] References Cited

U.S. PATENT DOCUMENTS

| | | | |
|---|---|---|---|
| 3,567,305 | 3/1971 | Collier | 350/3.68 |
| 3,813,685 | 5/1974 | St. John | 350/3.75 |
| 4,116,526 | 9/1978 | Clay et al. | 350/3.76 |
| 4,206,965 | 6/1980 | McGrew | 350/3.76 |
| 4,283,109 | 8/1981 | Huff et al. | 350/3.76 |

FOREIGN PATENT DOCUMENTS

2213133  8/1979  Fed. Rep. of Germany ..... 350/3.77

OTHER PUBLICATIONS

*RCA Engineer*, "Holographic Storage of Multicolor Information", G. T. Burton & B. R. Clay, Aug./Sep. 1972, vol. 18, No. 2, pp. 99–105.
*Optics Communications*, "Progress Report on Archival Storage of Color Films by a One Step Rainbow Holographic Process", P. H. Ruterbusch et al., Jun. 1981, vol. 37, No. 5, pp. 335–338.

*Primary Examiner*—Bruce Y. Arnold
*Attorney, Agent, or Firm*—Seed and Berry

[57] ABSTRACT

A new class of holograms, having the properties of full-color reconstruction from a single white light source, an extended vertical viewing aperture, and extended scene depth is disclosed. These advantageous properties are provided by a hologram composed of three intermeshed holograms, each of which reconstructs only one of the three color components of the scene. Each color component hologram consists of an array of noncontiguous small dots or thin stripes so that the three-color component holograms may be intermeshed without overlap of the dots or stripes. Associated with each color component hologram is a similar array of dot or stripe color filters which allow only the appropriate color of light to reconstruct each color component hologram. The component holograms themselves are vertically focused so that the composite hologram is white light viewable.

10 Claims, 8 Drawing Figures

FULL-COLOR HOLOGRAM

BACKGROUND OF THE INVENTION

1. Field of the Invention

This invention relates to holography, three-dimensional imaging, integral holography or multiplexed holography, and more particularly, to full-color holography.

2. Description of the Prior Art

Several methods of making full-color holograms have been demonstrated in the past, all of which are adequately summarized in "Optical Holography," by Collier, Burkhardt and Lin. These prior methods may be classified into three groups.

The first group represents the methods which rely on superimposing three holograms exposed with different colors on a single undivided holographic plate using identical reference beam angles. In a thin recording medium, this approach is not effective unless the viewing angle (the viewing aperture) is severely restricted. In a thick medium, the approach works very well for reasonably shallow scenes, particularly for reflection holograms. The problem with this approach is that volume recording materials are too expensive for many potential applications of holography.

The second group represents the methods which rely on different reference beam angles for three-color component holograms superimposed on the same holographic plate. This approach has been applied to "Benton-type" or "rainbow" holograms, thereby providing white light viewable holograms that appear to be in full color when viewed through a narrow aperture. When viewed outside the narrow aperture, the color ceases to appear realistic; furthermore, Benton-type holograms have a very limited vertical field of view.

The third group represents methods which depend on spatial sampling. As stated in "Optical Holography":

> If the hologram is recorded as a composite of many small areas, each of which records holographic fringes formed with one wavelength only, false reconstruction and false images can be eliminated entirely. A random distribution of these areas of elements is preferable, but an interlaced sequence, ordered according to wavelength, is permissible if the elements are small. In the reconstruction step, each element must be illuminated only by light of the wavelength used to form it. There then can be no crossmodulation and no false images. Each wavelength component of the subject wave is reconstructed from discrete noncontiguous samples of hologram area. Resolution is sacrificed in the process.

The third group of methods has been directed only toward "classical holograms"; i.e., holograms containing both horizontal and vertical parallax which are only viewable in monochromatic light. If the methods were directly applied to Benton-type holograms, no advantage would result, because the viewing aperture would be as limited as it is with the "second group methods" described above. However, the "third group methods" have never been tried on Benton-type holograms.

None of the ways heretofore proposed or demonstrated for generating full-color holograms are capable of generating holograms that are simultaneously free of color cross talk, white light viewable, and capable of displaying deep, clear images viewable through a large viewing aperture. In addition, none of the ways previously described or demonstrated is readily adaptable to inexpensive, high-volume hologram replication techniques, such as thermoforming.

SUMMARY OF THE INVENTION

It is an object of this invention to provide methods for generating full-color holograms with extended depth, extended viewing aperture, and freedom from color cross talk by use of a so-called "multiplex printer" or "integram printer."

It is a further object of this invention to provide methods for making full-color holograms viewable in white light.

It is a further object of this invention to provde a new class of holograms with the combined advantages of extended clear depth, extended viewing aperture, freedom from color cross talk, full-color capability, and suitability for low-cost, high-volume production.

These and other objects of the invention are provided by generating a vertically focused, horizontal parallax hologram composed of many small areas, such that the hologram is a composite of three color component holograms, each component hologram being in array of noncontiguous small areas. The small areas are non-overlapping in the composite hologram, and each color component hologram is a vertically focused, horizontal parallax hologram. A matched color filter array corresponding to the areas of the composite hologram causes each color component of the hologram to be reconstructed only by light of the corresponding color.

In various embodiments of the invention, the holograms are recorded as transmission, reflection; or surface relief holograms; and the color filter array is composed of color absorption filters, interference filters, holographic gratings, or surface relief, off-axis, zero order diffraction grating filters.

DETAILED DESCRIPTION OF THE INVENTION

The present invention combines the principles of white light viewable Benton-type holograms and color mosaic holograms with the principles of achromatic holograms to produce a white light viewable, full-color hologram with extended viewing aperture and extended image depth.

Figures 1, 2, 3, 4:
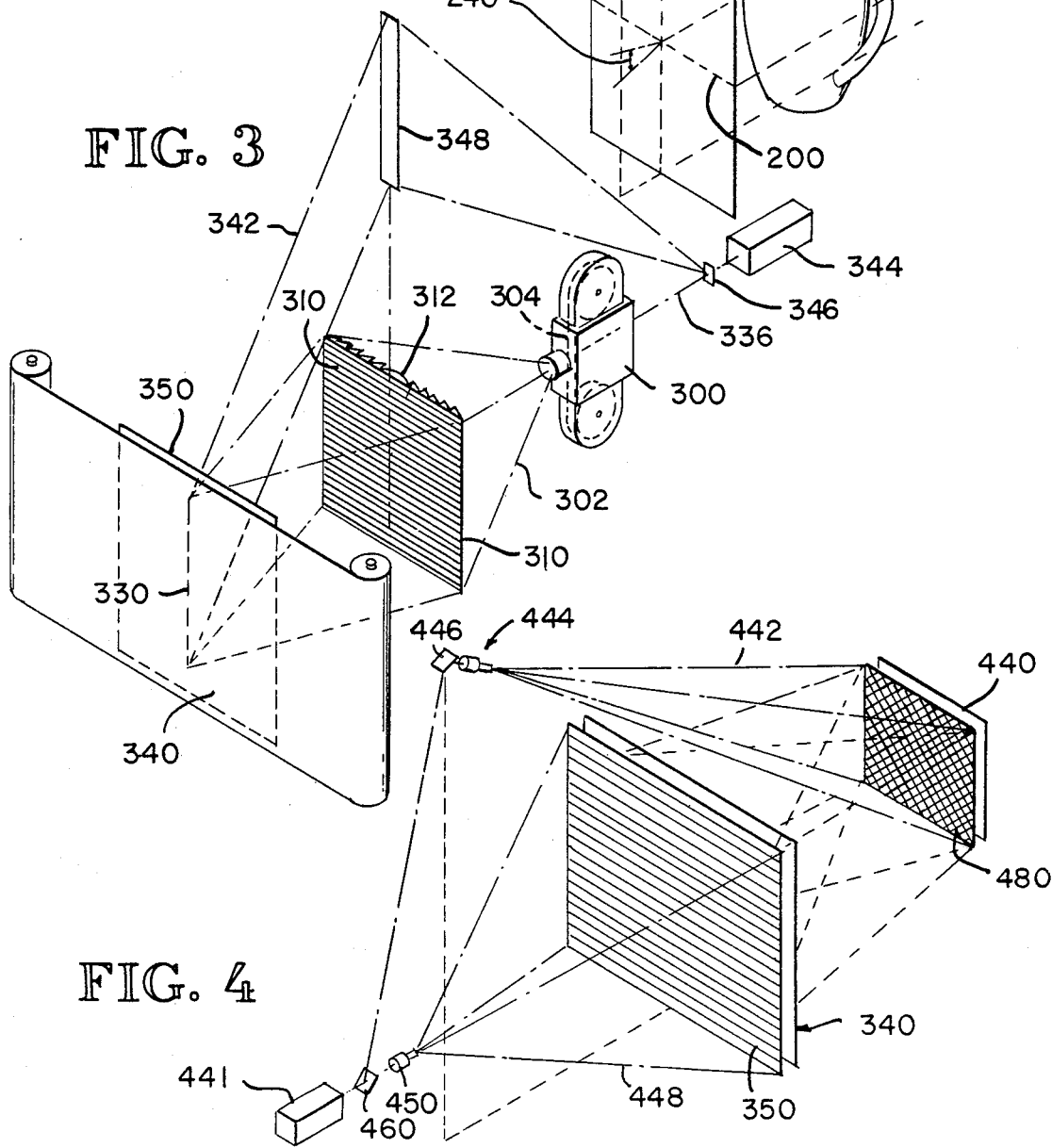
FIG. 1 is a schematic illustrating a color component hologram and matched color-selective filter.
FIG. 2 is a schematic illustrating the relationship between an object and information on a hologram pertaining to that object.
FIG. 3 is a schematic illustrating the initial procedure for forming one embodiment of a full-color multiplexed hologram.
FIG. 4 is a schematic illustrating the final procedure for forming one embodiment of a full-color multiplexed hologram.

FIG. 1 illustrates a preferred embodiment of the invention wherein a hologram 100 includes a mosaic of small areas 102,104,106 . . . N, each of which is a sub-element of a color component hologram. Each small area 102-N is covered by a corresponding color selective filter 112,114,116 . . . M so that when the hologram 100 is illuminated by a mixture of colors of light, each area 102-N receives only the color of light corresponding to the color of the component hologram of which the area is sub-element. The embodiment illustrated in FIG. 1 is analogous to a color halftone image printed as an array of colored dots in that the whole image is composed of several color separation images broken into small non-contiguous areas and intermeshed.

In the preferred embodiment, the color component hologram of each area 102-N is analagous to a Benton-type hologram (also known as a rainbow hologam or a white light transmission hologram), with the important difference being that the color component holograms of each area 102-N are focused on the recording medium in the vertical direction but are also vertically diffuse. This is illustrated in FIG. 2. "Vertically focused" refers to the fact that each horizontal line 200 in the component hologram 100 contains primarily information about that portion of an object 220 intersecting a plane 230 extending from the horizontal line 200 through the object 220. The plane 230 intersects the object 220 along the contour 232. "Vertically diffuse" refers to the fact that the information in each horizontal line, such as line 200, is reconstructed into a finite range of vertical angles even when reconstructed by monochromatic light.

A hologram with the properties shown in FIG. 2 is white light viewable if its reference beam diverges from a point located on the plane 250. If the angle 240 of vertical diffuseness is very small, the hologam may be classified as a Benton hologram; and it will appear in pure spectral colors dependent on the vertical viewing angle and the reconstruction source position.

On the other hand, if the angle 240 of vertical diffuseness becomes relatively large, the hologram 100 remains white light viewable but appears achromatic. Furthermore, the image becomes viewable over an extended vertical range corresponding to the angle 240 of the diffuseness. When such a vertically diffuse hologram 100 is reconstructed with only a single color of light, the entire image is viewable over a wide vertical range and it appears in that single color. Therefore, a vertically diffuse hologram 100, when covered with a colored filter (e.g., green transparent Mylar), will reconstruct only a green image, even when illuminated by white light.

All conventional holograms (except those recorded in thick-volume media) will reconstruct in all colors simultaneously when illuminated by white light. If two or three conventional holograms are combined onto a single plate, it is possible to construct and combine them in such a way that, when illuminated by white light and seen from a particular narrowly restricted position, each reconstructs only a predetermined color component of a scene so that a true color image is approximated. However, when the image is viewed outside the restricted position, it will no longer be seen in the correct colors due to so-called color cross talk.

The present invention eliminates color cross talk by combining several color component holograms onto a single plate, wherein the composite hologram constitutes a mosaic of small areas. Each small area contains only the fringe pattern of one color component and is covered by a color filter which passes only light of the corresponding color. Thus, at each point on the hologram, reconstruction of the image occurs only for one color and there is no color cross talk.

While the prior art includes this method of eliminating color cross talk, it has only been applied to classical holograms in the past, thus requiring reconstruction with a source of monochromatic light in three colors to prevent blurring due to the finite band-pass of the color filters.

The present invention eliminates the need for monochromatic light while maintaining a wide range of viewing positions for true color viewing by combining the color mosaic technique described above with the technique of white light achromatic holography, wherein each color component hologram is vertically focused and vertically diffuse, as described above.

One embodiment of the invention is a multiplexed hologram, also known as an integral hologram, consisting of many vertical strip holograms which together reconstruct an image of an object originally recorded on cinema film as a sequence of perspective views from points along a circle around the object. Each strip hologram is vertically focused and also vertically diffuse, as previously described. Each set of three adjacent strip holograms comprises three distinct color separations, and an array of color filter strips overlies the whole hologram so that each strip hologram is reconstructed only in its appropriate color.

Another embodiment of the invention is a multiplexed hologram made as shown in FIGS. 3 and 4. The system shown in FIG. 3 synthesizes a first hologram on holographic film 340, which is then used to make an image plane copy 440, as shown in FIG. 4. A conventional cinema film projector 300 is used to form an image beam 302 from a color cinema film 304 of an object scene simultaneously in three colors (e.g., red, green and blue) using coherent light. The image beam 302 is coherently projected onto a conventional vertical diffuser 310. In FIG. 3, the vertical diffuser 310 is shown with a cylindrical Fresnel lens 312 on its front surface. In practice, any optical system may be used which vertically diffuses the focused image and simultaneously redirects light in the image towards a vertical line 330 on the holographic film 340. For example, a simple isotropic diffuser, such as opal glass, may be used in combination with a slit aperture at the recording plane, but a more efficient use of the light entering the focal plane is to focus the light horizontally with a field lens toward the vertical line 330 and to vertically diffuse the light as shown in FIG. 3. The plane of the film 340 may be tilted away from the plane of the diffuser 310 to obtain improved clarity in the final image.

Figure 5:
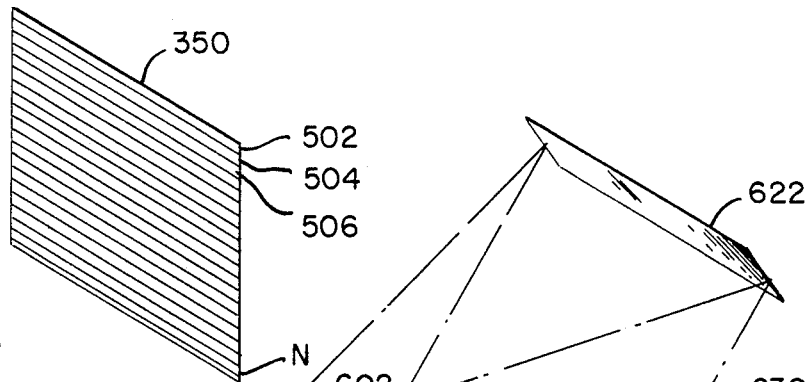
FIG. 5 is a schematic of a color filter array for use in forming a full-color multiplexed hologram in accordance with FIGS. 3 and 4.

A series of exposures is made such that the cinema film 304 is advanced by one frame and the holographic film 340 is moved by one slit width between exposures. A reference beam 342 from the same multicolor coherent source 344 as the image beam is brought in from overhead. In FIG. 3, the reference beam is shaped by holographic collimator 348 and holographic beam splitter 346, and the object beam is generated from the undiffracted beam 336 emergent from the beam splitter 346. However, any means for forming mutually coherent object and reference beams may be used. The reference beam contains coherent light of the three colors used in the cinema projector 300. The reference beam 342 overlaps the image beam 302 at the plane of the holographic film 340. A color filter array 350 is placed at the plane of the holographic film 340 to allow interference between the image beam 302 and the reference beam 342 of only one color at any particular point on the holographic film 340. Each strip hologram is thus composed of many small holograms recorded by the overlap of an image beam 302 having one of the colors from the source 344 and a reference beam 342 having the same color. A suitable color filter array 350 is shown in FIG. 5. The filter array includes horizontal elements 502,504,506 ... K which alternate in color (e.g., red, green, blue).

The multiplexed hologram made in FIG. 3 is then copied as shown in FIG. 4. The color filter array 350 allows only the appropriate color to reconstruct each small part of the multiplexed hologram 340. In the setup illustrated in FIG. 4, an image of the diffusing screen 310 of FIG. 3 is reconstructed on the surface of a second holographic recording film 440 to record a second hologram. The image of the diffusing screen 310 which has been recorded on the holographic film 340 is coherently reconstructed by illuminating the holographic film 340 with coherent light from a conventional coherent light source 441 through the color filter array 350. For optimum clarity and minimum distortion, the hologram 340 should be reconstructed by a beam conjugate to the reference beam 342 using in making hologram 340. The light from the source 441 corresponds in color to the light from the coherent light source 344 of FIG. 3 used to record the image on the holographic film 340. Each area of the holographic film 340 containing a holographic pattern formed by a particular color of light is thus illuminated by the same color monochromatic light from source 441 and filter array 350. For example, the areas on film 340 illuminated by red light from source 344 are also illuminated by red light (and only red light) from source 441.

An overhead reference beam 442 from lens 444 in combination with the coherently reconstructed image of the diffusing screen 310 recorded on the hologram 340 together generate a second interference pattern which is recorded on a second sheet of holographic film 440 through a second color filter array 480. The second color filter array 480 is placed next to the film 440 to produce a separation of color samples as was done in the recording of the first hologram 340. The color filter array 480, however, must be composed of very small areas, preferably smaller than the smallest detail of the image resolvable to the viewer. The hologram 440 recorded in FIG. 4 can be said to be both an image of the diffusing screen and an image of the original object scene recorded on the cinema film in the projector 300 in FIG. 3. The hologram 440 behaves similarly to a Benton-type hologram with a vertical diffuser placed in direct contact therewith, with the important difference being that the hologram 440 is composed of three color separation holograms intermeshed together. When the hologram 440 is reconstructed by illumination with white light while overlayed with the color filter array 480, the image appears in full color with a vertical angle corresponding to the angle of diffusion of the diffuser 310.

Figure 6:
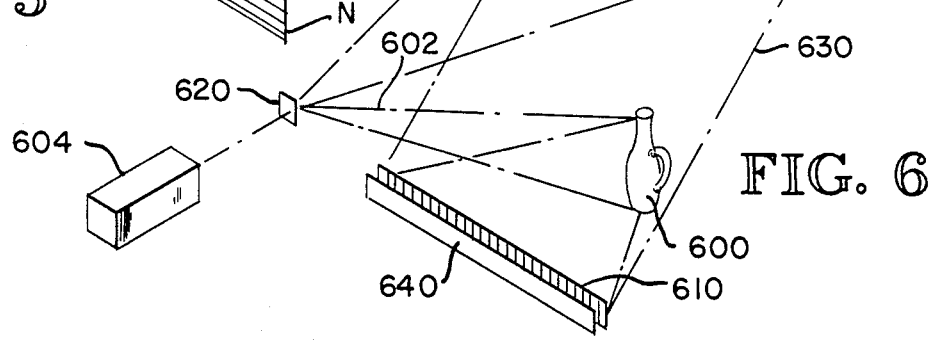
FIG. 6 is a schematic illustrating the initial procedure for forming one embodiment of a non-multiplexed, full-color hologram.

Another embodiment of the invention produces a full-color hologram of an object without multiplexing, as illustrated in FIG. 6. Accordingly, an object 600 is illuminated simultaneously with coherent light 602 of different colors, such as red, green and blue, generated by light source 604 (e.g., a combination of helium-cadmium, helium-neon and argon ion lasers). In FIG. 6, the reference beam is formed by the combined action of holographic beam splitter 620 and holographic collimator 622, while the object illumination beam is formed directly by holographic beam splitter 620. A long horizontal strip hologram is formed on holographic film 640 by light reflected from the object 600, transmitted through a color filter array 610, and mixed with an overhead reference beam 630 mutually coherent with the object illumination and, of course, containing the same three colors of coherent light as are contained in the object illumination. This first hologram 640 is an intermeshed composite of three color separation "classical" holograms.

Figure 7:
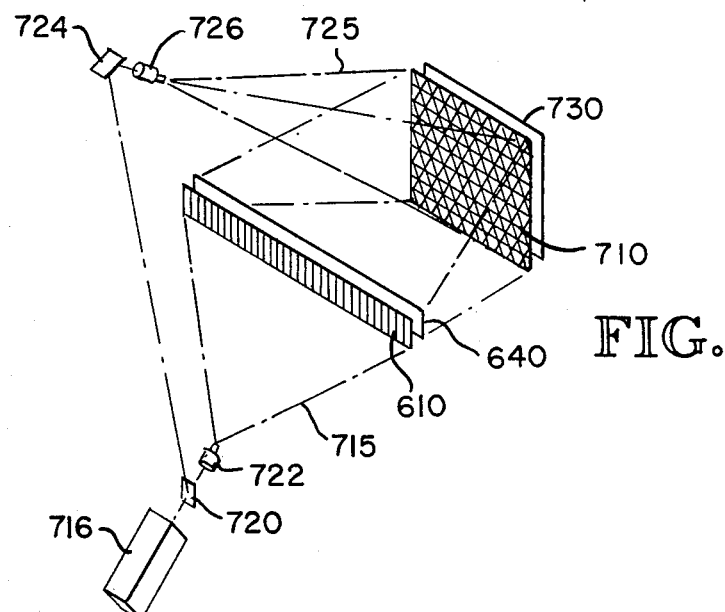
FIG. 7 is a schematic illustrating the final procedure for forming one embodiment of a non-multiplexed, full-color hologram.

The hologram 640 is then coherently reconstructed as shown in FIG. 7 by illuminating it with a multicolor coherent beam 715 conjugate to beam 630 of FIG. 6 through the color filter array 610.

A second hologram is recorded on holographic film 730 positioned at the location of the reconstructed image of the object 600 by interference between the light in the reconstructed image from film 640 in combination with color filter array 610 and the light in a coherent, three-color reference beam 725 from a reference source 726 which is incident upon a holographic recording film 730 through a second color filter array 710. As in the preceding embodiments, the array 710 permits only one color of light to form an interference pattern at any particular small area on the film 730. The hologram recorded in FIG. 7 is not vertically diffuse so can only be viewed from a narrow range of vertical positions. Its vertical viewing range can be extended by placing it in contact with a vertical diffuser or else by recording it with a vertical diffuser in the reference beam 725.

The above-disclosed methods of making a full-color hologram all produce holograms with a common set of characteristics which serve as a practical definition of the type of hologram which is the subject of the present invention. That is, the new type of hologram (hereinafter termed a "color matrix hologram") is defined as two or more arrays of perceptually small color separation holograms intermeshed on a single surface, such that each array is equivalent to a spatially sampled monochromatic hologram of an object scene, containing no more than a perceptually small degree of vertical parallax information, with the holograms in the arrays being non-overlapping.

A perceptually small hologram is a hologram that is comparable in size to the smallest detail resolvable in the image. A perceptually small degree of vertical parallax information implies that the image is vertically focused. In a vertically focused hologram, information about any particular point in the image is contained only in a narrow horizontal strip of the hologram, as indicated in FIG. 2.

The color filter arrays employed in the making and viewing of color matrix holograms can take many forms and assume many configurations. The basic requirement is that the array must block or deflect undesirable colors so that only the desired color of light can pass through the hologram at each point and contribute to the reconstruction of the image. The filter array can either prevent undesired colors from entering the hologram at each point, or it can prevent undesired colors at each point from entering the eye of the viewer. A second requirement is that the pattern of colored areas imposed on the hologram image by the filter array must be such that the pattern be substantially imperceptible when the hologram is viewed under normal conditions. For the pattern to be substantially imperceptible means that the width of the pattern lines, the diameter of the pattern dots or, in general (in mathematical terms), the central peak of the autocorrelation function of the pattern must have a minimum dimension less than or comparable to the smallest detail resolvable in the image by the viewer. Stripes, dot patterns, and pseudorandom patterns are all possible. The color filter may be composed of colored transparent regions, regions of multilayer dielectric interference filters, or any other color selective means.

Figure 8:
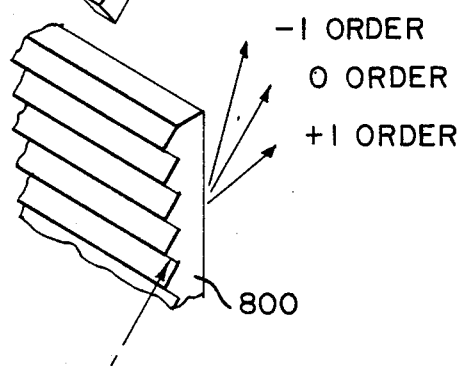
FIG. 8 is a schematic of one embodiment of a color-selective filter adapted for use in viewing a full-color hologram.

One color selective means, particularly attractive because of its low manufacturing cost and the ease of maintaining good registration between it and its associated holograms, is an off-axis-zero-order diffraction grating 800 (hereinafter referred to as an OZOD), illustrated in FIG. 8. Such a grating can be ruled, or it can be made holographically in a photoresist medium by retroreflection of a substantially spherical wavefront of predetermined wavelength, as shown in FIG. 8. It is well within the abilities of a skilled holographer to calculate the exact geometry to use during exposure with one wavelength in order to achieve correct diffraction characteristics under illumination by another wavelength of light from a point source in a given position relative to the photoresist-coated plate. One suitable photoresist medium is dichromated gelatin, due to its capacity for sensitization to any visible wavelength.

A way to make an OZOD suitable for use in viewing color matrix holograms is to use the same means used in making the color matrix holograms (e.g., an array of color filter dots or stripes) in conjunction with the arrangement shown in FIG. 4 or 7 to record a corresponding pattern of small OZOD's with the desired filtration characteristics. Alternatively, an OZOD may be mechanically ruled. The advantage of a surface relief OZOD color selection means is that it can be embossed just as the color matrix hologram can be embossed if the color matrix hologram is recorded as a surface relief hologram. For example, the color matrix hologram and the OZOD filter can be embossed onto opposite sides of the same transparent sheet material at the same time, thereby assuring repeatably exact registration between the two.

Although the preferred embodiment of the invention is a surface relief color matrix hologram with an OZOD filter matrix, several other embodiments are useful. For example, the hologram can be formed in a fine-grained silver halide photographic medium wherein color selectively is implemented by adding pigments to the medium in a predetermined pattern, or by laminating a color filter array to the medium. Similarly, the hologram may be formed in a dichromated gelatin, photopolymer, or photothermoplastic medium wherein color selectivity is implemented by pigmentation in a predetermined pattern or by laminating a color matrix to the medium. Alternatively, the color filter array may be in the form of dots of colored, transparent ink printed directly onto the hologram or the hologram substrate; or it may be incorporated directly into the holographic recording in a volume recording material.

Many mass production methods for color matrix holograms are practical. For surface relief color matrix holograms, some practical mass production methods include embossing, hot stamping, roll-on hot stamping, calendaring, thermoset resin casting, solvent casting, injection molding, pressure molding, and UV-cured resin casting. These methods require a durable surface relief master mold which can be made by electroforming, resin casting, or silicone rubber casting directly onto an original surface relief hologram recorded in photoresist, hardened gelatin or photothermoplastic.

The science of holography has matured to the point where it is well understood by skilled workers in the field that "coherent light" is not required for making holograms. Holograms have been made by mechanical engraving, computer-controlled electron beam exposure of electron resists, contact printing with white light sources, and even in white light interferometers. It is well known that what is important is not so much how the hologram is formed but the geometry of the light-diffracting pattern we call a hologram, regardless of how it is made. It is not even correct anymore to say that a hologram reconstructs an object wavefront. Modern multiplexed holograms do not reconstruct an object wavefront; rather, they reconstruct features of an object which are large compared to the wavelength of light.

It will be understood that the invention is not limited to using any particular type of recording media or processing conditions. For example, surface relief holograms, thin-phase holograms and volume phase holograms are all suitable. Furthermore, any hologram type, including transmission, reflection and multiplexed holograms, may be used. Also, any type of color-selective means, including color-transparent filters, interference filters, surface relief gratings, and phase diffraction gratings, may be used. It will be understood that the above examples are illustrative only, and that other image-forming systems embodying the essential aspects of color matrix holograms, i.e., vertically focused image, color component separation, and color selection matrix, all fall within the scope of the present invention.

Therefore, the ways shown herein for producing color matrix holograms are given as easily understood examples of ways to make color matrix holograms and not as the only ways or the best ways of making color matrix holograms. Any method for producing the light-diffracting patterns which comprise a color matrix hologram is an acceptable method for making color matrix holograms; and any light-diffracting pattern with the characteristics which define a color matrix hologram is a color matrix hologram regardless of the methods used to generate the pattern or produce copies thereof. Furthermore, a color matrix hologram may be of the front beam (transmission) type, the back beam (reflection) type, or the front beam type but viewed by reflection.

I claim:
1. A multicolor hologram comprising:
    a first group of small areas of a recording medium, said group bearing diffractive patterns substantially corresponding to a spatially sampled, first hologram recorded in a first color and bearing an image having horizontal parallax, substantially no vertical parallax, and a finite degree of vertical diffuseness;

first color filter means proximate said first group of small areas to limit reconstruction of an image from said first group of areas to a predetermined first color;

a second group of small areas of said recording medium non-overlapping with said first group of small areas and distributed on said surface, said second group bearing diffractive patterns substantially corresponding to a spatially sampled, second hologram recorded in a color different from that of said first hologram and bearing an image with horizontal parallax, substantially no vertical parallax, and a finite degree of vertical diffuseness; and second color filter means located proximate said second group of small areas to limit reconstruction of the image from said second group of areas to a predetermined second color.

2. The multicolor hologram of claim 1 wherein the images in said recited first and second holograms are vertically focused substantially upon said recording medium but are horizontally focused elsewhere than substantially open said medium.

3. The multicolor hologram of claim 1 wherein said diffractive patterns are surface relief holograms and said color filter means are zero-order diffraction color filters.

4. The multicolor hologram of claim 1 wherein at least one of said recited first and second holograms is a multiplexed hologram composed from a range of perspective views of a three-dimensional scene.

5. A system for making color matrix holograms, comprising:
means for generating upon a high-resolution recording medium a first light-diffractive pattern reconstructing an object scene when said diffractive pattern is illuminated by a first color of light, said light-diffractive pattern substantially corresponding to a hologram bearing an image vertically focused substantially upon said medium and horizontally focused elsewhere than substantially upon said medium;
means for limiting the generation of said diffractive pattern on said medium to a first group of small areas distributed on said medium;
means for generating upon said medium a second light-diffractive pattern reconstructing an object scene when said second diffractive pattern is illuminated by a second color of light, said second light diffractive pattern substantially corresponding to a hologram bearing an image vertically focused substantially upon said medium and horizontally focused elsewhere than substantially upon said medium; and
means for limiting the generation of said second diffractive pattern on said medium to a second group of small areas distributed on said medium.

6. The system of claim 5 wherein said means for generating said diffractive patterns is a strip multiplexed hologram printer.

7. The system of claim 5 wherein said means for generating a light-diffractive pattern comprises at least one master hologram containing a representation of said object scene, means for reconstructing said master hologram with a plurality of colors of coherent light, and means for recording said light-diffractive pattern as a hologram of said reconstruction of said object scene such that said hologram of said reconstruction is a color matrix hologram.

8. A method for producing multicolor holograms, comprising:

creating an original color matrix hologram comprising at least a first group and a second group of small areas of a recording medium, each of said groups bearing diffractive patterns substantially corresponding to a spatially sampled hologram recorded in a predetermined color and bearing an image with horizontal parallax, substantially no vertical parallax, and a finite degree of vertical diffuseness; wherein said second group of small areas of said recording medium is substantially non-overlapping with said first group of small areas and is distributed on said surface; and replicating said original color matrix hologram onto a substrate in registration with matched color-selective means imposed upon the same substrate such that said matched color-selective means substantially prevents color cross-talk among color components of the hologram during reconstruction while permitting reconstruction of each of said groups in the corresponding colors.

9. A method of making a multicolor hologram, comprising:
recording a series of incoherent perspective views of a scene, said views being located along a horizontal line in a predetermined position relative to said scene;
constructing a first hologram on a first recording medium from said series of views by projecting with coherent light said views sequentially into an optical system which vertically disperses said coherent light from a focal plane, said first hologram being further constructed by recording downstream from said optical system the interference between said coherent light and a reference beam which is coherent with respect to said coherent light, said first hologram constructed such that, upon illumination with a reconstruction beam, said views are reconstructed in superposition to constitute a three-dimensional image of said scene;
limiting the recording of said first hologram such that groups of small, substantially non-overlapping areas on said first recording medium bear interference patterns corresponding primarily to predetermined color components of said scene;
reconstructing a three-dimensional image of said scene by illuminating said first hologram with a reconstruction beam of coherent light and providing means to limit the reconstruction of each of said groups of said small areas primarily to the corresponding colors of said reconstruction beam;
constructing a second hologram on a second recording medium by recording the interference beween the reconstruction of said scene and a second reference beam coherent with respect to said reconstruction beam; and
limiting the recording of said second hologram such that groups of small areas on said second medium bear interference patterns corresponding primarily to the predetermined color components of said scene.

10. The method of claim 9, further comprising:
limiting the recording of said first hologram such that groups of small, substantially non-overlapping areas on said first recording medium bear interference patterns corresponding primarily to predetermined color components of said scene; and
limiting the reconstruction of each of said groups to said small areas on said first medium primarily to the corresponding colors of said reconstruction beam.

* * * * *